(12) United States Patent
Brown

(10) Patent No.: US 7,536,932 B1
(45) Date of Patent: May 26, 2009

(54) SPHERICAL FLYWHEEL ENERGY STORAGE SYSTEM

(76) Inventor: James Brown, 502 Anita St., Space 86, Chula Vista, CA (US) 91911

( * ) Notice: Subject to any disclaimer, the term of this patent is extended or adjusted under 35 U.S.C. 154(b) by 1 day.

(21) Appl. No.: 11/963,978

(22) Filed: Dec. 24, 2007

(51) Int. Cl.
*H02K 7/02* (2006.01)
*F16C 15/00* (2006.01)

(52) U.S. Cl. .................. 74/572.1; 74/572.2; 74/572.11; 310/74

(58) Field of Classification Search ................ 74/572.2, 74/572.1, 5.95; 310/74, 153
See application file for complete search history.

(56) References Cited

U.S. PATENT DOCUMENTS 3,105,657 A * 10/1963 Mueller et al. ............... 244/166
3,742,769 A * 7/1973 Crutcher et al. ................ 74/5 R
7,263,912 B1 * 9/2007 Gabrys et al. ............ 74/572.21

* cited by examiner

*Primary Examiner*—Richard W L Ridley
*Assistant Examiner*—Timothy J Murphy
(74) *Attorney, Agent, or Firm*—Steven W. Webb

(57) ABSTRACT

A spherical flywheel is described and specified that stores rotational energy more efficiently than cylindrical flywheels. The spherical flywheel is composed of multiple layers of material with the densest material at the surface. The flywheel surface is dimpled with a pattern similar to golf ball surfaces, to minimize aerodynamic drag.

4 Claims, 1 Drawing Sheet

SPHERICAL FLYWHEEL ENERGY STORAGE SYSTEM

FIELD OF THE INVENTION

The present invention relates to the field of flywheel energy storage devices. In particular, this invention elates to non-cylindrically-shaped flywheels made of nontraditional materials.

BACKGROUND OF THE INVENTION

Conventional rotary power is designed to be used as it is generated, with direct linkages and gears. Some applications, such as automobile engines, require a energy/momentum storage device that links the power generation and power consumption stages of the engine system.

The automobile engine and transmission system possesses a cylindrical flywheel which is literally a metal wheel. Setting this flywheel spinning stores a certain amount of energy and momentum in the wheel's motion, which can be used when the transmission is engaged by means of a clutch.

Other power generation systems, such as turbines and windmills also benefit from flywheel application, to minimize power interruptions and smooth out power flows. The shape of "flywheels" is based on the stored angular momentum of a spinning, flat cylinder with an axis of rotation through its center. Alternative spinning shapes can be used to store angular momentum and mechanical energy as well.

SUMMARY OF THE INVENTION

The flywheel sphere is comprised of a heavy, dense shell filled with a stiff, lightweight composite or other material. The entire flywheel-sphere is contained within a partial sphere, which is connected through its axis to axles running through the center of rotation.

The enclosing sphere is rigid and is connected fixedly to the flywheel-sphere. The axles can be connected to a drive motor and generator and are contained in magnetic or air bearings, to minimize rotational friction.

The surface of the enclosing sphere is covered with a dimple pattern, similar to the dimple pattern on golf balls. These dimples decrease the surface air friction by breaking up the laminar air flow into a turbulent air flow. The turbulent air surrounding the spinning sphere will provide the minimum air friction at any rotational speed.

The invention is used to store rotational energy and momentum from the driving motor, which can be used to drive a generator or other power sink.

Other capabilities of the invention will become apparent from the detailed specification in combination with the accompanying drawings showing preferred embodiments of the invention.

DESCRIPTION OF THE PREFERRED EMBODIMENT

Figure 1:
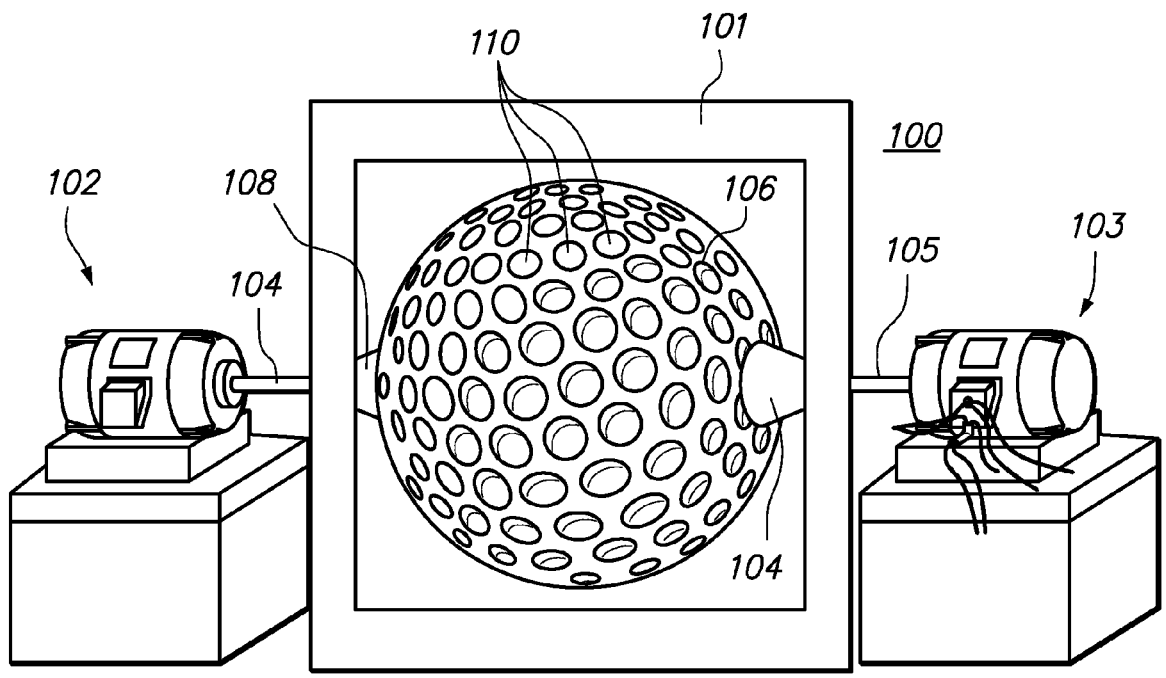
FIG. 1 is a conceptual view of the invention with drive motor and generator

The present invention 100 is shown in the preferred embodiment in FIG. 1, enclosed in a rigid frame 101. There is a motor 102 and a generator 103 connected to the invention 100 by means of external axles 104, 105, which external axles 104, 105 are attached to the exterior surface 106 of the enclosing sphere 107 with axle attachment means 108, 109.

The exterior surface 106 is covered with a plurality of dimples 110, which are scattered over the exterior surface 106 in a definite pattern, the pattern selected to minimize rotational friction with the air. In the preferred embodiment, this pattern is copied from the popular pattern for the surface of golf balls.

Figure 2:
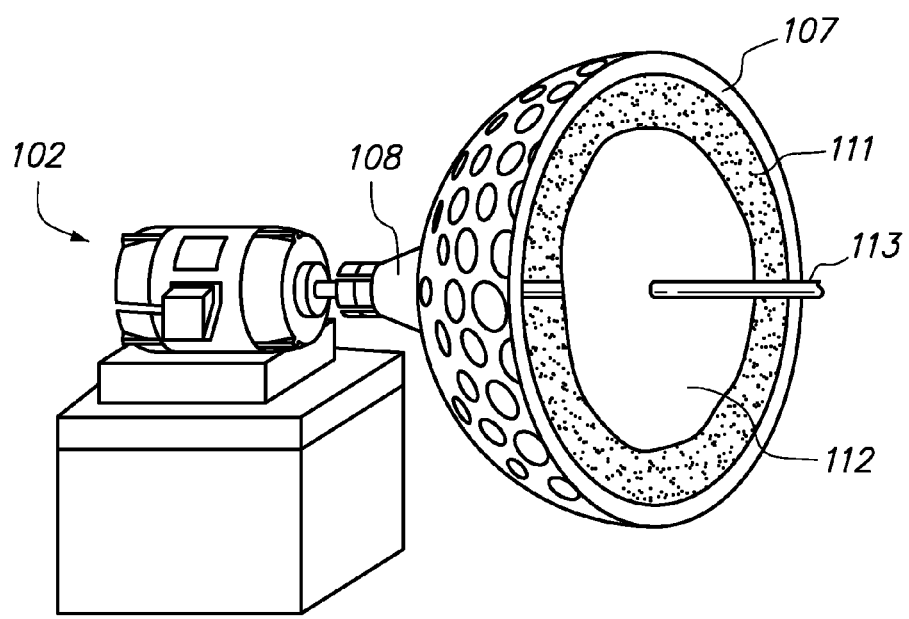
FIG. 2 is a cutaway view of the invention

FIG. 2. shows the invention 100 in cutaway. The invention 100 is comprised of an enclosing sphere 107, comprised of a rigid material, which possesses an exterior surface 106 with a plurality of dimples 110 in the previously mentioned dimple pattern, a shell 111 comprised of dense material, a lightweight inner sphere 112, and an axle 113 passing through the invention connecting to the axle attachment means 108, 109. The lightweight inner sphere 112 is rigidly attached to the axle 113, the shell 111 is fixedly attached to the lightweight inner sphere 112, and the external sphere 107 is fixedly attached to the shell 111.

The invention is used by attaching a driving motor 102 to one of the external axles 104 of the assembled invention 100 inside the frame 101. In the preferred embodiment, a generator 103 is attached to the other external axle 105. The motor 102 is started up and the external axle 104 fixedly attached to the attachment means 108 spins the enclosing sphere 107.

At some future time, the generator 103 is engaged onto the external axle 105 and the rotational energy stored in the invention 100 turns the generator 103 and produces electric power. Note that the amount of power from the generator 103 will always be less than the energy expended by the motor 102 to spin the invention 100.

This invention has other applications, potentially, and one skilled in the art could discover these. The explication of the features of this invention does not limit the claims of this application; other applications developed by those skilled in the art will be included in this invention.

What is claimed is:

1. A spherical flywheel, the spherical flywheel comprised of an enclosing sphere, a concentric shell enclosed within the enclosing sphere, a concentric internal sphere enclosed within the shell, the internal sphere comprised of a rigid material, the internal sphere connected fixedly to the shell, the shell connected fixedly to the enclosing sphere, the enclosing sphere possessing an external surface, the external surface covered with a plurality of dimples, the spherical flywheel penetrated through its rotational axis with an axle, the axle attached at each end to an axle attachment means where the axle extends beyond the external surface, the axle attachment means each attached fixedly to an external axle, each external axle extending in line with the axle, the axle attachment means attached fixedly to the external surface of the enclosing sphere, the density of the shell greater than the density of the concentric internal sphere.

2. The spherical flywheel as in claim 1, where the material comprising the shell is selected from lead, iron, or depleted uranium.

3. The spherical flywheel of claim 1, where the material comprising the internal sphere is selected from plastic, ceramic, or wood.

4. The spherical flywheel of claim 1, where the spherical flywheel is enclosed in a metal frame, the external axles extending through the metal frame and the spherical flywheel completely enclosed in the metal frame.

* * * * *